C. A. LOHMAN.
DRY KILN TRUCK.
APPLICATION FILED NOV. 17, 1916.
1,263,687. Patented Apr. 23, 1918.
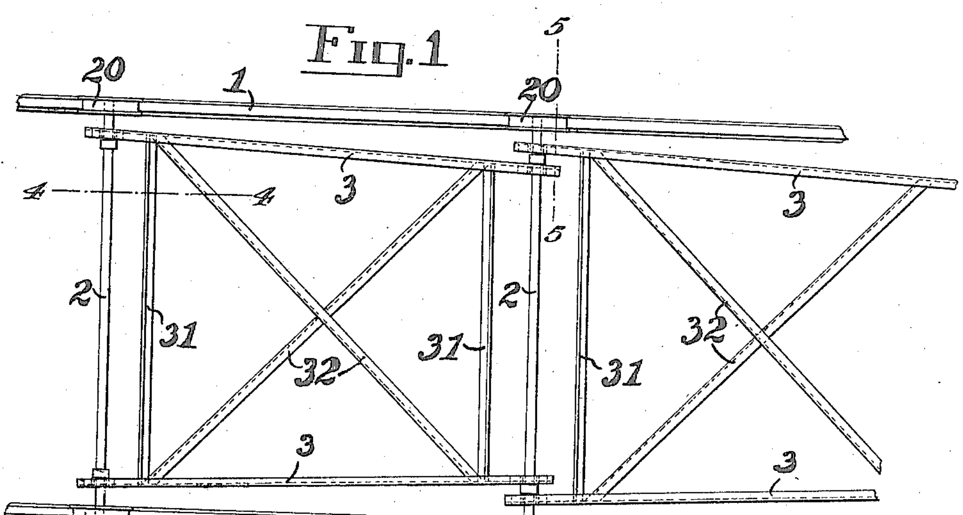
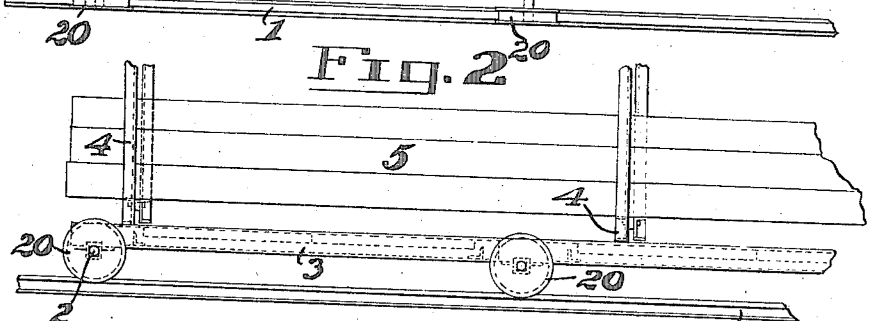
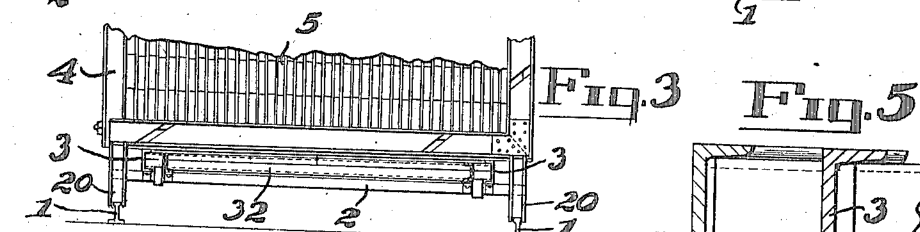
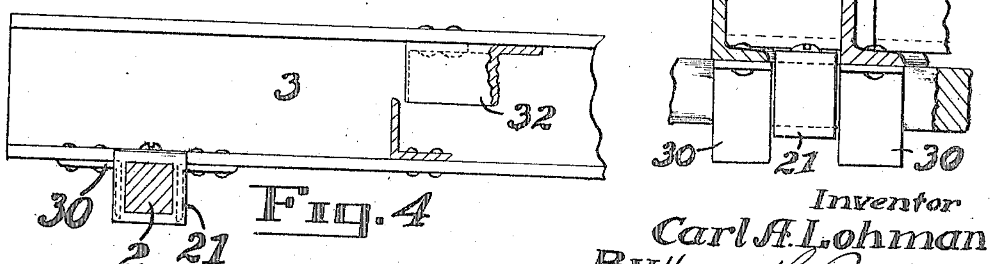
Inventor
Carl A. Lohman
By Henry L. Reynolds.
Attorney

UNITED STATES PATENT OFFICE.

CARL A. LOHMAN, OF SEATTLE, WASHINGTON.

DRY-KILN TRUCK.

1,263,687. Specification of Letters Patent. Patented Apr. 23, 1918.

Application filed November 17, 1916. Serial No. 131,853.

*To all whom it may concern:*

Be it known that I, CARL A. LOHMAN, a citizen of the United States, and resident of the city of Seattle, county of King, and State of Washington, have invented certain new and useful Improvements in Dry-Kiln Trucks, of which the following is a specification.

My invention relates to trucks or equivalent devices which are intended for employment in holding lumber and conveying the same through a dry kiln, or for other analogous uses.

The object of my invention is to provide a form of truck or rolling support for a load which is capable of being reduced to small parts and being assembled and disassembled conveniently, and also of being moved readily from place to place.

Another object is to provide a truck construction in which the truck parts may be joined together in such manner as to form an assembled whole, connected together throughout the length of the kiln, whereby the trucks and other loads may be conveyed through the kiln by pulling from one end instead of having to push a number of independent loads on the same track.

My invention comprises the novel features of construction which are herein shown and defined by the claims.

In the drawings I have shown my device in the form of construction which is now preferred by me.

Figure 1 is a plan view showing two truck sections in assembled condition.

Fig. 2 is a side elevation of the same showing a load thereon.

Fig. 3 is an end view of the load supported upon my present truck structure.

Fig. 4 is a detail section through one corner of the supporting frame and the axle on line 4—4 of Fig. 1, showing the manner of connecting these parts.

Fig. 5 is a section taken at a similar point or on line 5—5 of Fig. 1, but with the view lengthwise the truck.

My present truck structure is composed of a series of parts consisting of a series of axles with their attached wheels and connecting frame members which are supported from these axles. The axles 2 are each provided with wheels 20, one at each end thereof, which wheels are mounted to turn upon the axle. While a structure might be employed in which the wheels were secured to the axle and the axle turned in the bearing engagement upon the frame, I prefer the other construction in which the wheels turn upon the axle. In this latter construction I also prefer that the axle 2 be square in cross section, as shown in Fig. 4. This latter feature, however, is non-essential.

The frame sections are made so as to be attached to and detached from these axles by simply placing them thereon or lifting them therefrom. These frame sections are made of any suitable length. I prefer to use comparatively short lengths. The construction of the frame herein shown consists of two channel beams 3 which extend lengthwise the frame, that is, are intended to extend in the same direction as the rails 1 upon which the truck runs. These two channel beams are connected to form a single frame, as by the transversely placed angle bars 31, and the diagonal braces 32.

Each axle has two collars 21 thereon, these being, one near each end of the axle. These serve to locate the frames and to prevent them from moving lengthwise the axle. The frames are constructed with side bars 3 nearer together at one end than the other, so that when placed upon two axles, one end will lie between the collars, while the other end will lie outside the collars.

In building up the supporting train, as it might be called, the narrow end of one frame lies inside of the wide end of the adjacent frame with the collar 21 between them. To prevent relative movement of the frame and axle in the direction of the track, each of the side frame members 3 is provided with two downwardly extending projections near each end thereof, these being placed and spaced apart so that they will lie, one forward and the other rearward of the axle. These projections may conveniently be made by securing to the side bars a short section 30 of an angle bar.

In using this device a number of axles may be placed on the track and connected up by the frames. The loads of lumber are preferably made into large bundles and these then placed upon the frames. In Figs. 2 and 3, bundles are shown, these being held in place by frames 4 which surround them. These frames may rest directly upon the truck frames, as is shown in Fig. 2. Under this plan the lumber is supported upon what is, in effect, a train composed of a considerable number of trucks. These are connected together in such manner that the entire train may be advanced through the kiln by pulling through the exit end of the kiln.

The lumber may be placed upon the trucks and removed therefrom by means of cranes or other power devices. It is, therefore, unnecessary to keep the kiln doors open for any considerable length of time when placing or removing lumber. The parts composing the trucks are all of light weight and may be readily picked up and carried anywhere desired.

What I claim as my invention is:

1. A truck system for lumber drying kilns, comprising a series of axles, each having two wheels thereon, and separable frame sections provided with means at each end for temporary engagement with the said axles.

2. A truck system for lumber drying kilns, comprising a series of axles, each having two wheels thereon, frame sections each having side bars secured together with slightly greater separation at one end than at the other and provided with means for disengageable connection with the said axles.

3. A truck system for lumber drying kilns, comprising a series of axles, each having two wheels thereon, frame sections each having side bars secured together with slightly greater separation at one end than at the other and provided at each end with depending members adapted to lie at opposite sides of said axles.

4. A truck system for dry kilns and the like comprising a series of axles having a wheel at each end and a series of frames provided at each end with means for engaging said axles and adapted to permit the engagement of each axle by opposite ends of two of said frames, whereby a continuous interlocked system of knockdown trucks may be formed.

5. A truck system for lumber dry kilns comprising axles having wheels thereon, connecting frame sections and means for temporary engagement of the frame sections, each with two axles.

Signed at Seattle, Washington, this 11th day of November, 1916.

CARL A. LOHMAN.

Copies of this patent may be obtained for five cents each, by addressing the "Commissioner of Patents, Washington, D. C."